(12) United States Patent
Gordon et al.

(10) Patent No.: US 10,034,043 B2
(45) Date of Patent: Jul. 24, 2018

(54) RECORDED MULTIMEDIA AND LIVE TELEVISION ROAMING

(71) Applicant: ARRIS Enterprises, Inc., Suwanee, GA (US)

(72) Inventors: Alan Gordon, Kirkland, WA (US); John Kneeling, Kirkland, WA (US); Glen C. Chang, Woodinville, WA (US)

(73) Assignee: ARRIS Enterprises LLC, Suwanee, GA (US)

( * ) Notice: Subject to any disclaimer, the term of this patent is extended or adjusted under 35 U.S.C. 154(b) by 131 days.

(21) Appl. No.: 14/041,962

(22) Filed: Sep. 30, 2013

(65) Prior Publication Data

US 2014/0096166 A1    Apr. 3, 2014

Related U.S. Application Data

(60) Provisional application No. 61/707,903, filed on Sep. 29, 2012.

(51) Int. Cl.
*H04N 21/44* (2011.01)
*H04N 21/426* (2011.01)
*H04N 21/433* (2011.01)
*H04N 21/442* (2011.01)

(52) U.S. Cl.
CPC ... *H04N 21/44004* (2013.01); *H04N 21/4263* (2013.01); *H04N 21/4333* (2013.01); *H04N 21/442* (2013.01)

(58) Field of Classification Search
CPC .................................................. H04N 21/433
See application file for complete search history.

(56) References Cited

U.S. PATENT DOCUMENTS

| 2002/0009285 | A1* | 1/2002 | Safadi et al. ................... 386/46 |
| 2006/0080707 | A1* | 4/2006 | Laksono .......................... 725/38 |
| 2008/0022330 | A1* | 1/2008 | Barrett ................... H04N 7/163 725/89 |
| 2008/0060027 | A1* | 3/2008 | Yang ............................... 725/88 |
| 2009/0089832 | A1* | 4/2009 | Kendall .......................... 725/38 |
| 2011/0162017 | A1* | 6/2011 | Dodd ................. H04N 21/4333 725/78 |
| 2012/0079547 | A1* | 3/2012 | Kim ................. H04N 21/43615 725/111 |

FOREIGN PATENT DOCUMENTS

WO    WO-2013089670 A1 *  6/2013  ....... H04N 21/42204

* cited by examiner

*Primary Examiner* — Fernando Alcon
(74) *Attorney, Agent, or Firm* — Bart A. Perkins

(57) ABSTRACT

Methods, systems, and apparatuses can be operable to facilitate pausing playback of recorded multimedia or live television on a multimedia player and resuming playback from the pause point on the same or a different multimedia player. A user can pause a channel on a multimedia player and resume play of the paused channel on a different multimedia player. A user can pause a channel on a multimedia player and tune the multimedia player to a different channel without losing content associated with the paused channel.

23 Claims, 10 Drawing Sheets

RECORDED MULTIMEDIA AND LIVE TELEVISION ROAMING

CROSS REFERENCE TO RELATED APPLICATION

This application is a non-provisional application claiming the benefit of U.S. Provisional Application Ser. No. 61/707,903, entitled "Video Playback and Live Television Roaming," which was filed on Sep. 29, 2012, and is incorporated herein by reference in its entirety.

TECHNICAL FIELD

This disclosure relates to the facilitation of pausing playback or recorded multimedia or live television on a multimedia player and resuming playback from the pause point on the same or a different multimedia player.

BACKGROUND

Multiple services operators (MSO) use community access television (CATV) network infrastructure for carrying television content signals and video on demand (VoD) signals, among other types. Typically, multiple set-top boxes are installed in a customer's premise to allow content to be viewed in multiple rooms within the premise. Digital video recorders (DVRs) and personal video recorders (PVRs) have allowed users to record programs for later viewing, thereby time-shifting their television viewing. In general, the amount of content available for viewing or recording is limited by the number of tuners in a set-top box installed at the customer's premise. It is desirable to provide users with the ability to move from room to room within a premise and seamlessly access content throughout the premise.

BRIEF DESCRIPTION OF THE DRAWINGS

Like reference numbers and designations in the various drawings indicate like elements.

DETAILED DESCRIPTION

In embodiments, systems and methods can operate to facilitate pausing playback of recorded multimedia or live television on a multimedia player and resuming playback from the pause point on the same or a different multimedia player. Customers have the ability to pause a program on a set-top box, but are unable to resume play of the paused program on a different set-top box within the customer's premise. Also, customers are unable to pause a program on a set-top box and tune to a different program on the set-top box without losing stored content associated with the paused program. In embodiments, systems and methods can operate to allow a customer to pause a program and resume play of the paused program on a different set-top box or tune the same set-top box to a different program without losing stored content associated with the paused channel.

Figure 1:
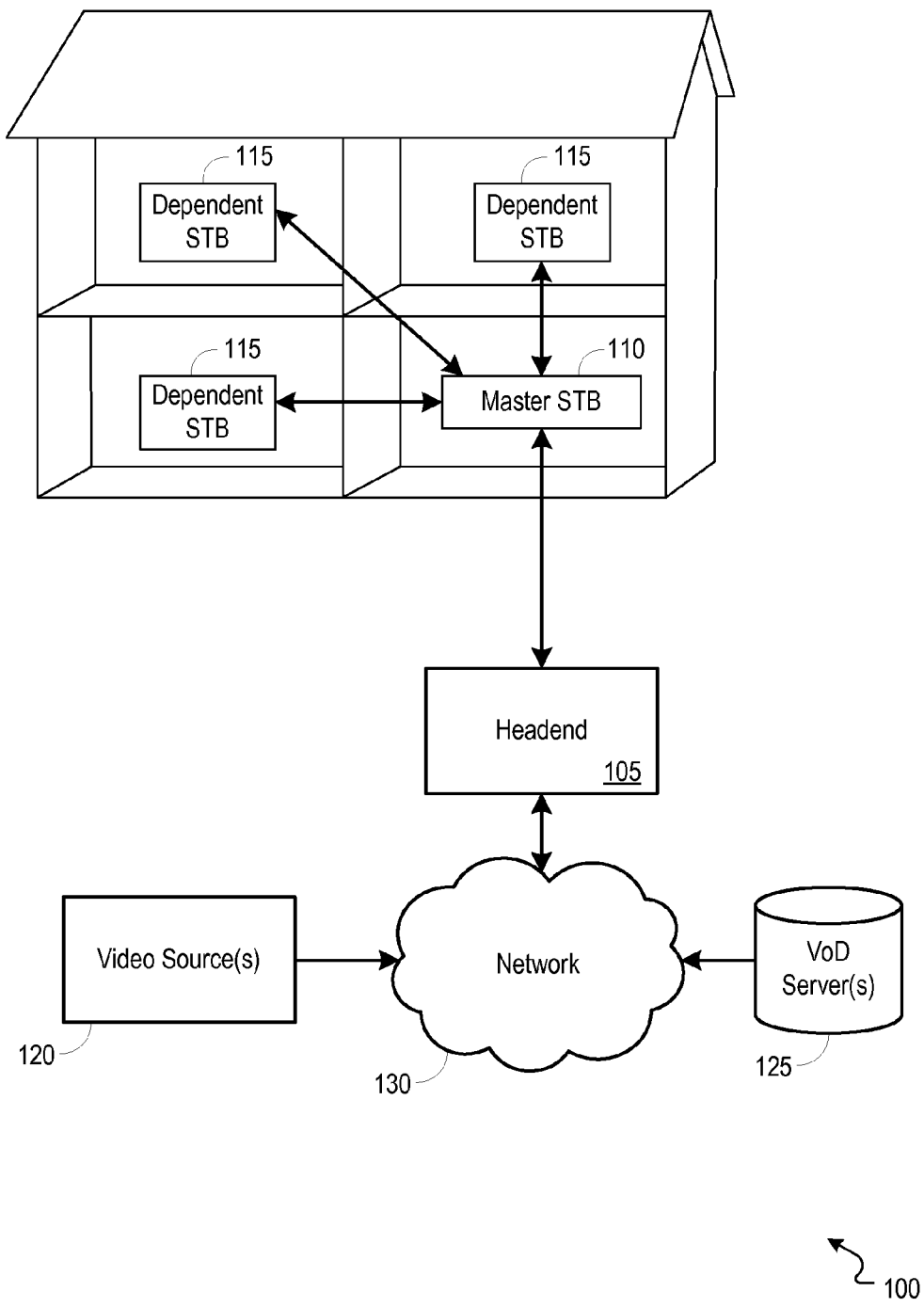
FIG. 1 is a block diagram illustrating an example system operable to facilitate pausing playback of recorded multimedia or live television on a multimedia player and resuming playback from the pause point on the same or a different multimedia player.

FIG. 1 is a block diagram illustrating an example system 100 operable to facilitate pausing playback of recorded multimedia or live television on a multimedia player and resuming playback from the pause point on the same or a different multimedia player. In embodiments, a headend 105 can provide video service(s) (e.g., video content received by a headend 105 from one or more video sources 120 or one or more VoD servers 125 via a network 130) to one or more customer premise equipment (CPE) devices (e.g., master set-top box 110) in one or more subscriber groups (e.g., service group(s)). In embodiments, a headend can deliver live television (e.g., media streaming in real time from a television channel) to one or more CPE devices. In embodiments, live television can include playback of a record buffer associated with a buffered television channel, pay-per view channels, and other types of content delivered from a headend to one or more CPE devices. In embodiments, a headend can deliver stored content (e.g., VoD signals) to one or more CPE devices. In embodiments, a customer can access content stored on a CPE device (e.g., DVR content).

In embodiments, a master set-top box 110 can facilitate communications from the headend 105 to a television and/or one or more dependent set-top boxes or multimedia players 115. For example, one or more dependent set-top boxes or multimedia players 115 can be connected to a master set-top box 110 and can be located in one or more different rooms within a customer's premise.

Figure 2:
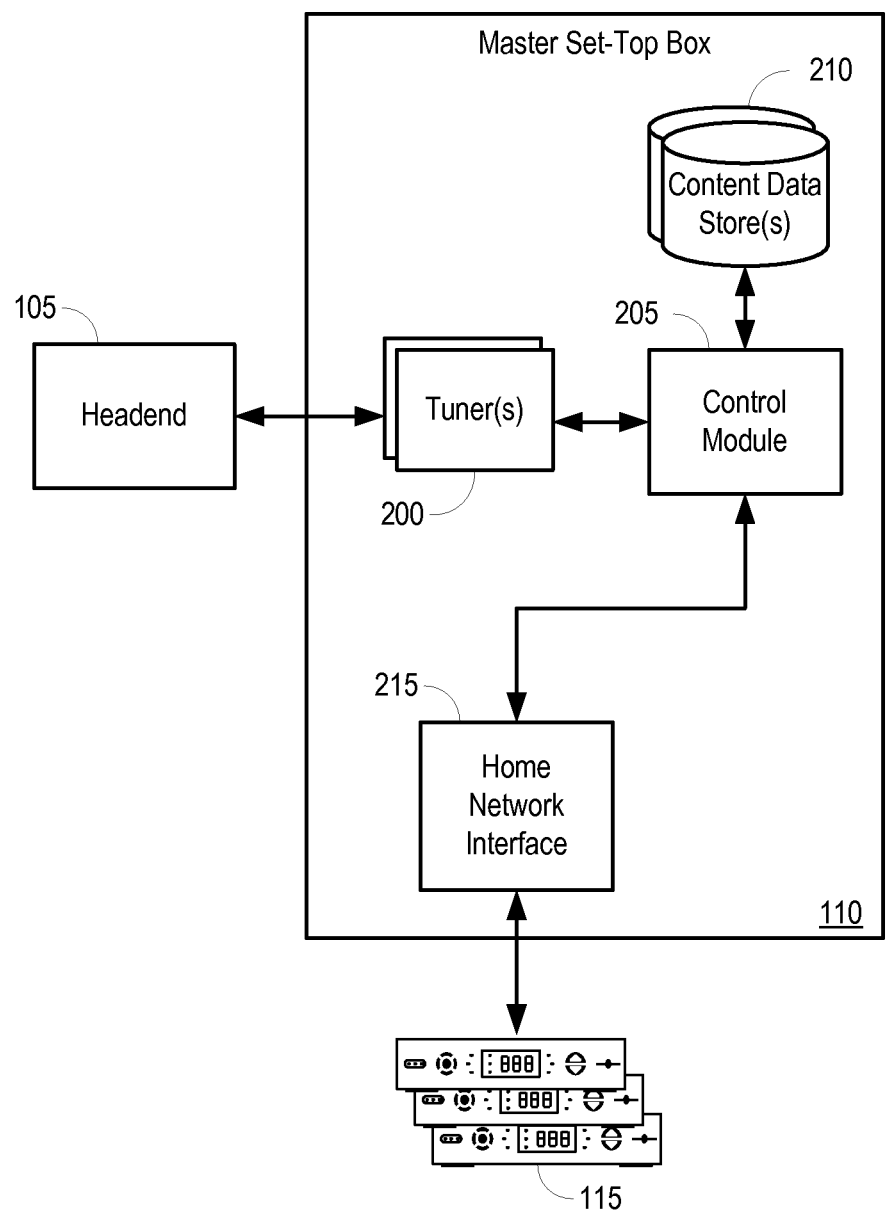
FIG. 2 is a block diagram illustrating an example device operable to facilitate pausing playback of recorded multimedia or live television on a multimedia player and resuming playback from the pause point on the same or a different multimedia player.

FIG. 2 is a block diagram illustrating an example master set-top box 110 operable to facilitate pausing playback of recorded multimedia or live television on a multimedia player and resuming playback from the pause point on the same or a different multimedia player. In embodiments, a master set-top box 110 can include one or more tuners 200, a control module 205 (e.g., a processor), one or more content data stores 210, and a home network interface 215.

In embodiments, video content from one or more video source(s) 120 of FIG. 1 or one or more VoD server(s) 125 of FIG. 1 can be received through one or more tuner(s) 200 via an interface with a headend 105. As an example, where the master set-top box 110 has more than one tuner, a customer can view content from a first channel on a display device connected to the set-top box while the set-top box records content from a plurality of other channels. As another example, where the master set-top box has more than one tuner, the set-top box can record content from a number of channels equal to the number of tuners in the set-top box. It should be understood that a tuner may be a single device used to capture information related to a channel or program, or the tuner may be a virtual tuner that uses IP or other protocols to access information related to a specific channel or program. For example, for a device attached to a CATV hybrid fiber coaxial (HFC) network, a narrowband quadrature amplitude modulation (QAM) tuner, a wideband tuner, or a collection of narrowband tuners can be used to access a program stream within a data over cable service interface specification (DOCSIS) bonded channel. Other implementations using other broadband access networks may not use explicit tuners, but can extract the relevant channel or program information directly from an IP network.

In embodiments, a control module 205 can receive video content from the one or more tuners 200. In embodiments, the control module can instruct the one or more tuners to tune to a specific channel. For example, the control module can instruct a tuner to tune to a channel designated for live viewing by a customer. As another example, the control module can instruct a tuner to tune to a channel designated for recording by a customer. In embodiments, the control module 205 can forward content to a data store. For example, when a user designates a channel for recording or pauses a channel, the control module can forward content associated with the channel to one or more content data stores 210. In embodiments, upon receiving video content, the control module 205 can forward the content to one or more media players. For example, when a customer requests to view recorded content or live television, the control module can forward content received from a tuner 200 to a multimedia player 115 for display on a television (or other display device). As another example, when a customer tunes a multimedia player 115 to a channel that was paused on the same or a different multimedia player, the control module can forward content associated with the paused channel (e.g., content stored on the content data store 210) to the media player 115 via a home network interface 215.

In embodiments, a tuner 200 can be configured to tune to a specific channel and a control module 205 can convert a signal received through the tuner into stream data (e.g., MPEG stream data) for transmission to a multimedia player and/or a storage device (e.g., content data store(s) 210) as a program file. In embodiments, the control module 205 can generate an index to associate a timestamp with a specific location of the program file. When a user issues a transport control command (e.g., rewind, replay, fast-forward, skip, etc.), the control module 205 can interpret the command and can use the index to retrieve the corresponding data from storage for transmission to the multimedia player.

In embodiments, when a control module 205 receives a request to pause a channel, the control module can create a television roaming pause (TVRP) (the point in a video content stream at which the stream is paused and the point from which the video content stream will resume) at the point in the content at which the channel associated with the content was paused. For example, when a subscriber pauses a live television stream, a TVRP can be automatically (e.g., the TVRP is created without any additional input from a user) created in storage (e.g., in memory or storage, such as content data stores 210). In embodiments, a program allocation table can be used by the control module 205 to identify what packets to decode and store. For example, the control module 205 can identify what packets are associated with a paused program based upon information in a program allocation table. In embodiments, the control module 205 can use an index to locate data in a program file that corresponds to a specific TVRP.

In embodiments, when the channel associated with a tuner is changed, any existing TVRP on that tuner can be cleared. In embodiments, a TVRP associated with a live television stream can have a predetermined maximum age. For example, when a TVRP has been set for a time period longer than its predetermined maximum age, the TVRP can be cleared from the tuner upon which it is stored. In embodiments, a predetermined TVRP maximum age can be stored as a setting on the master set-top box 110 and can be set and/or changed in various ways (e.g., by the customer, device manufacturer, MSO, etc.). In embodiments, a live television program can have a unique TVRP maximum age. For example, a television network can establish unique TVRP maximum ages associated with the network's television programs.

In embodiments, a TVRP associated with a DVR recording can be associated with the DVR recording itself, rather than a tuner. Therefore, a TVRP associated with a DVR recording can persist until the TVRP is used or the DVR recording is deleted. In such embodiments, a TVRP associated with a DVR recording can persist without the application of a predetermined TVRP maximum age. Furthermore, a TVRP associated with a DVR recording can persist when a master set-top box or multimedia player associated with the DVR recording is rebooted.

In embodiments, where a TVRP already exists on a tuner and a new pause on the tuner creates a new TVRP, the new TVRP can replace the previously existing TVRP on the tuner. In embodiments, where a TVRP associated with a first channel is set on a first tuner and playback of a second channel is paused, a new TVRP associated with the second channel can be set on a second tuner without clearing the TVRP associated with the first channel from the first tuner.

In embodiments, when playback of a live television record buffer is paused, a TVRP can be set at the point in the live television stream at which playback was paused or at the point in the live television record buffer at which playback was paused. In such embodiments, when the live television record buffer no longer includes the TVRP point, playback of the live television record buffer can resume from the earliest point in the live television record buffer.

In embodiments, after the control module creates a TVRP, the control module can forward content associated with the paused channel to a content data store 210. When the control module 205 receives a request to resume play of the paused channel, the control module can retrieve stored content associated with the paused channel, beginning at the TVRP, and forward the content to a multimedia player 115. In embodiments, when a request to resume play of a paused channel is received by a control module 205 from a media player 115, the control module can retrieve stored content associated with the paused channel, beginning at the TVRP, and forward the content to the multimedia player.

Figure 3:
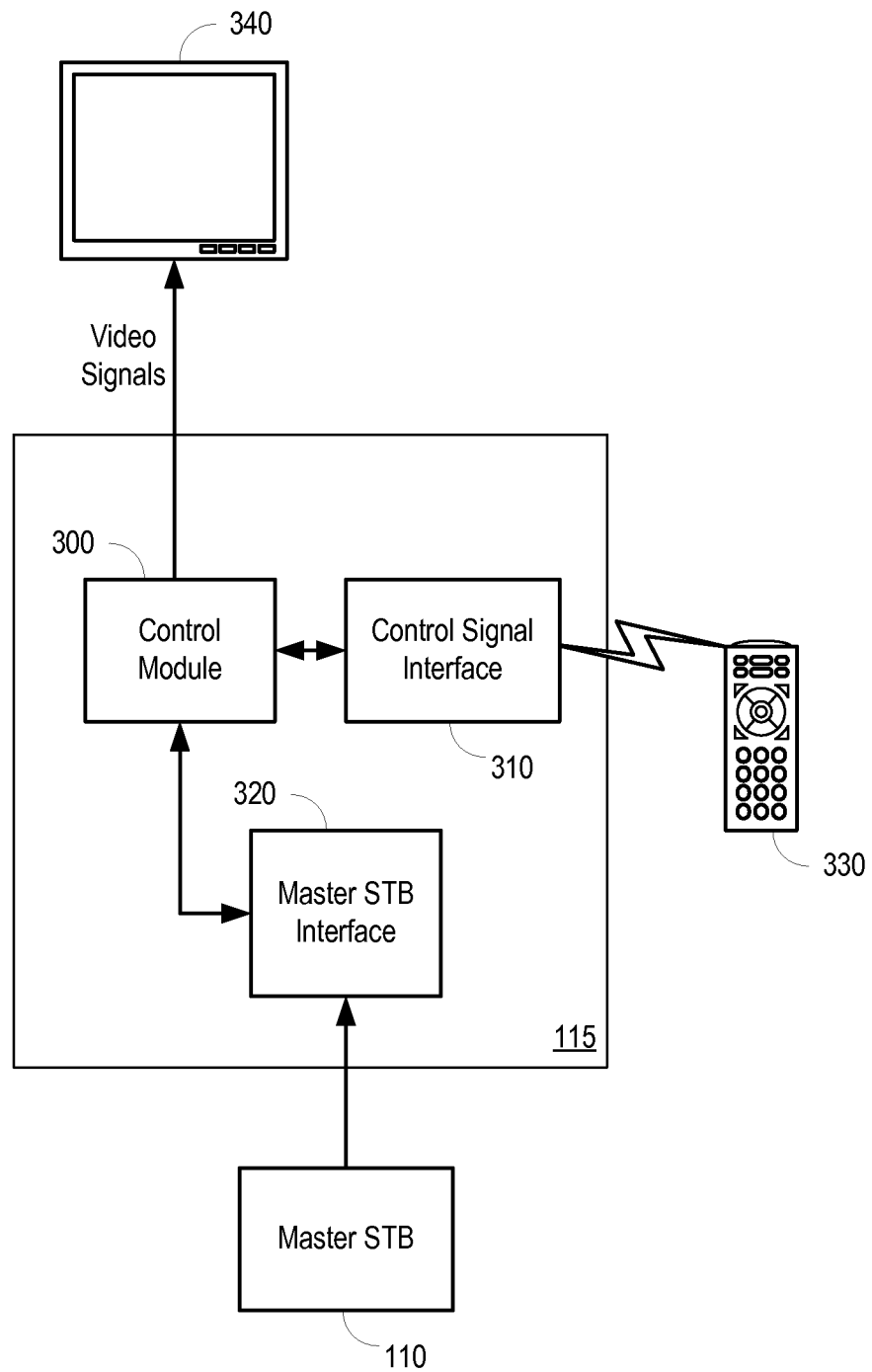
FIG. 3 is a block diagram illustrating an example dependent multimedia player operable to facilitate pausing playback of recorded multimedia or live television and resuming playback from the pause point on the same multimedia player or a different multimedia player.

FIG. 3 is a block diagram illustrating an example dependent multimedia player 115 operable to facilitate pausing playback of recorded multimedia or live television and resuming playback from the pause point on the same multimedia player or a different multimedia player. In embodiments, a multimedia player 115 can include, a control module 300 (e.g., a processor), a control signal interface 310, and a master set-top box interface 320.

In embodiments, control signals can be communicated from a remote control device 330 to a control signal interface 310. The control signals can operate to provide requests from a customer to the control module 300 which can communicate with the master set-top box 110 using the master set-top box interface 320. The control module 205 of FIG. 2 can act based upon the requests received through the control signal interface 310. For example, a customer can use a remote control device to communicate trickplay requests (e.g., pause, play, stop, fast-forward, etc.) and/or tuning designations (e.g., channel to tune to, channel to record, etc.) to the control module via the control signal interface. In embodiments, the control module 300 can forward video content received from a master set-top box to a display device 340.

In embodiments, a subscriber can resume playback of a live television stream or a DVR recording from a TVRP point. For example, when a subscriber tunes a multimedia player 115 to a channel for which a TVRP is set, the channel can resume playback from the TVRP point. A subscriber can direct a multimedia player to tune to a specific channel using a variety of inputs on a remote control device 330 (e.g., entering the number associated with the channel and pressing "OK," entering the number associated with the channel and waiting for the media player to automatically tune to the channel number, pressing the "Last" key to return to a previously viewed channel, navigating to a specific channel using a channel guide or channel grid, etc.). A subscriber can resume playback of a live television stream or a DVR recording from a TVRP point on the multimedia player from which the TVRP was set or on another multimedia player within the subscriber's premise. In embodiments, a TVRP can be cleared from a tuner when playback of a channel associated with the TVRP is resumed from the TVRP point. In embodiments, where a TVRP is created on a tuner and playback of the channel associated with the TVRP is resumed on the same multimedia player without changing channels in between pausing and resuming playback, the TVRP can remain on the tuner without being cleared. In embodiments, when a subscriber resumes playback of a live television stream or a DVR recording from a TVRP point, a message can be displayed on a display device 340 informing the subscriber that playback has resumed from a TVRP.

Figure 4:
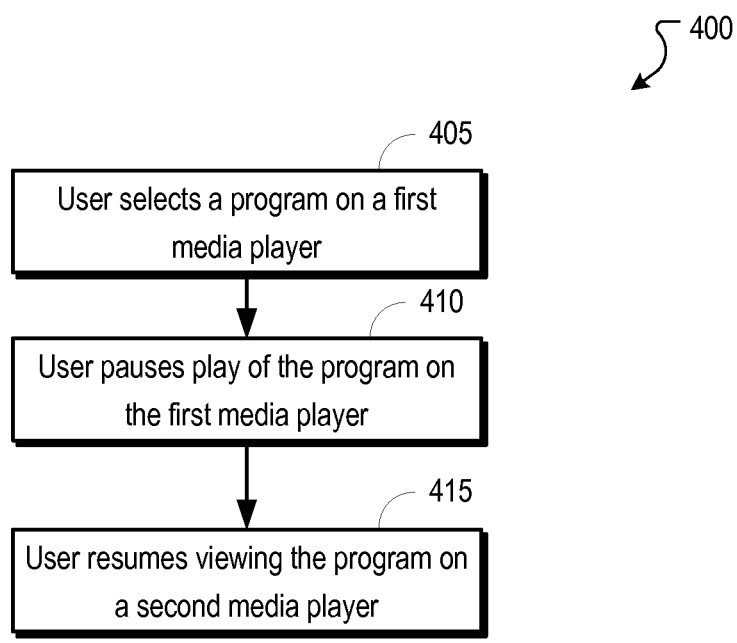
FIG. 4 is a flowchart illustrating an example process operable to facilitate pausing playback of recorded multimedia or live television on a multimedia player and resuming playback from the pause point on a different multimedia player.

FIG. 4 is a flowchart illustrating an example process 400 operable to facilitate pausing playback of recorded multimedia or live television on a multimedia player and resuming playback from the pause point on a different multimedia player. The process 400 can start at 405 when a user selects a program on a first multimedia player. In embodiments, the user can select a live television program to view on a multimedia player. In embodiments, the user can select recorded content to be viewed on the multimedia player (e.g., DVR content, VoD content, etc.).

At 410, the user can pause play of the program. For example, the user can pause play of the program by using a pause function on an input device (e.g., remote control) associated with the first multimedia player. In embodiments, when a user pauses play of the program, a TVRP can be associated with the program. In embodiments, after a user pauses play of the program, the user can prevent the first multimedia player from resuming play of the program after a predetermined pause timeout period has lapsed. For example, the user can use a stop function on an input device associated with the first multimedia player to prevent the first multimedia player from resuming play of the paused program.

At 415, the user can access the paused program on a second multimedia player. For example, when the user selects the paused program on a second multimedia player (e.g., the user tunes the second multimedia player to the channel associated with the paused program), the second multimedia player can resume play of the program from the TVRP that was set when the program was paused on the first multimedia player.

Figure 5:
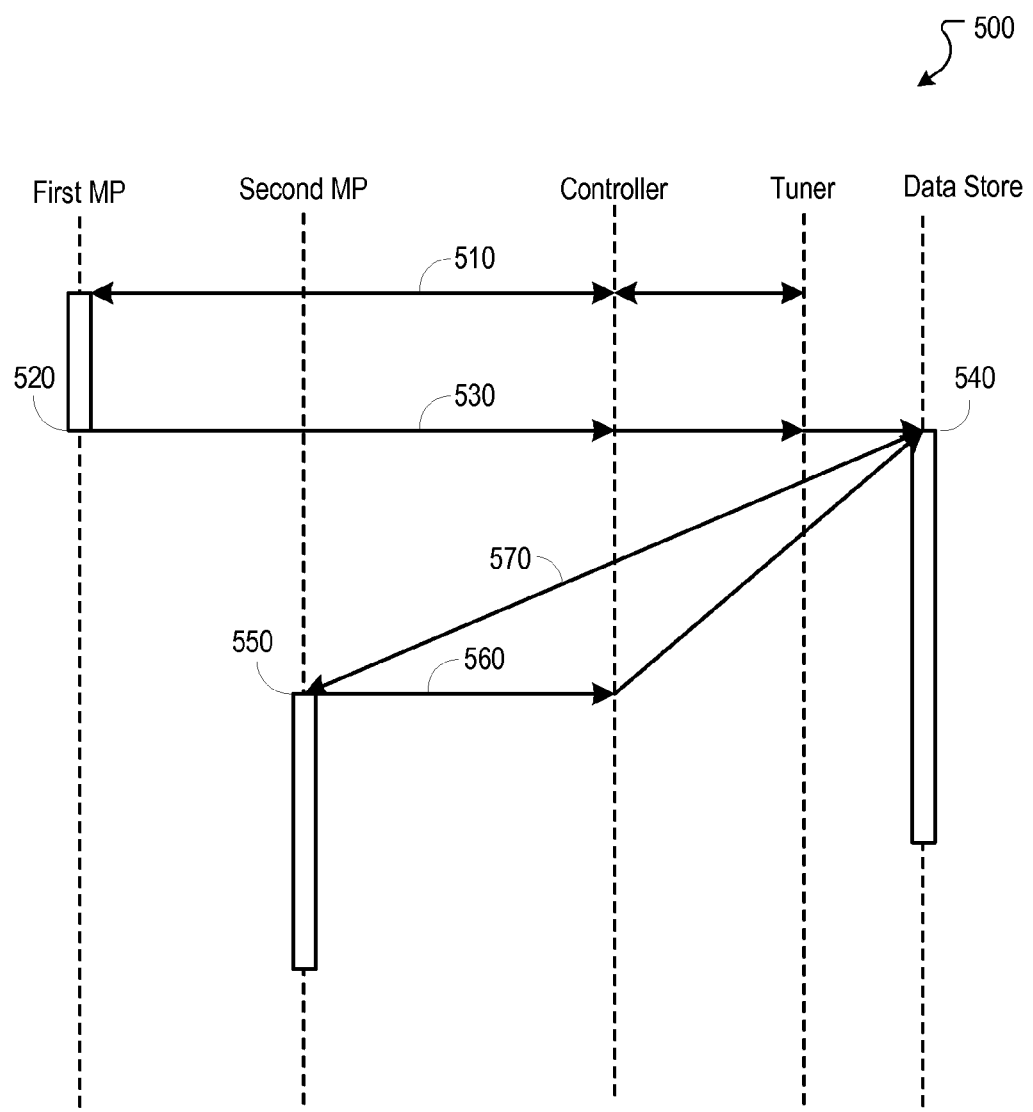
FIG. 5 is a diagram illustrating interactions between a plurality of multimedia players and a controller operable to facilitate pausing playback of recorded multimedia or live television on a multimedia player and resuming playback from the pause point on a different multimedia player.

FIG. 5 is a diagram 500 illustrating interactions between a plurality of multimedia players and a controller operable to facilitate pausing playback of recorded multimedia or live television on a multimedia player and resuming playback from the pause point on a different multimedia player. In embodiments, a first multimedia player can select a program and the program can be streamed from a tuner to the first multimedia player via a controller through interaction 510.

In embodiments, a user can pause a program streaming to the first multimedia player from the tuner at point 520. In embodiments, when the user pauses a program, the first multimedia player can instruct the controller (e.g., through interaction 530) to record the paused program and set a TVRP. For example, when the user pauses a program, the controller can direct the program information from the tuner into a data store for later access. When the user pauses a program, a TVRP, the point 540 at which the data store begins storing program information associated with the paused program, can be set by the controller and stored in the data store.

In embodiments, the user can return to the paused program on a second multimedia player at point 550. In embodiments, the second multimedia player can select the paused program (e.g., the user tunes the second multimedia player to the channel associated with the paused program) and the controller can direct the data store to stream the paused program to the second multimedia player through interaction 560. For example, when the second multimedia player tunes to the paused program, the controller can direct the data store to stream a recording of the paused program beginning at the TVRP 540, and the data store can stream the recording to the second multimedia player through interaction 570.

Figure 6:
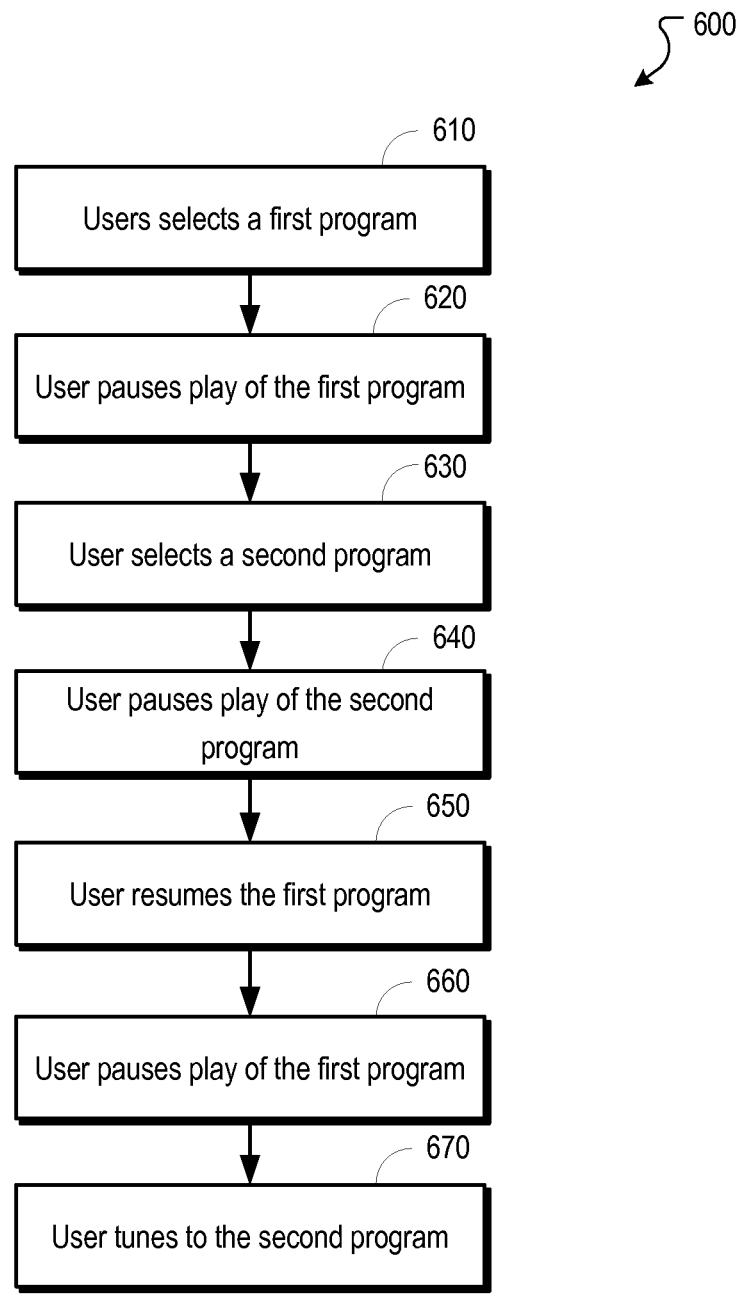
FIG. 6 is a flowchart illustrating an example process operable to facilitate pausing a first recorded or live television multimedia content on a multimedia player, viewing a second recorded or live television multimedia content on the same multimedia player and resuming play of the first recorded or live television multimedia content from the pause point on the same multimedia player.

FIG. 6 is a flowchart illustrating an example process 600 operable to facilitate pausing a first recorded or live television multimedia content on a multimedia player, viewing a second recorded or live television multimedia content on the same multimedia player and resuming play of the first recorded or live television multimedia content from the pause point on the same multimedia player. The process 600 can start at 610 when a user tunes a multimedia player to a first program. In embodiments, the user can tune a multimedia player to view live television. In embodiments, the user can tune a multimedia player to view recorded content.

At 620, the user can pause play of the first program. For example, the user can pause play of the first program by using a pause function on an input device (e.g., remote control) associated with the multimedia player. In embodiments, when a user pauses play of the first program, a first TVRP can be set on a first data store record associated with the first program and with the multimedia player.

At 630, the user can select a second program. In embodiments, the user can use the multimedia player to view live television. In embodiments, the user can use the multimedia player to view recorded content.

At 640, the user can pause play of the second program. For example, the user can pause play of the second program by using a pause function on an input device (e.g., remote control) associated with the multimedia player. In embodiments, when a user pauses play of the second program, a second TVRP can be set on a second data store record associated with the second program and associated with the multimedia player.

At 650, the user can resume the first program on the multimedia player. In embodiments, when the user resumes the paused first program, the multimedia player can resume play of the first program from the first TVRP that was set when the program was paused on the multimedia player.

At 660, the user can pause the first program and, at 670, the user can resume viewing the second program on the multimedia player. In embodiments, when the user resumes the paused second program, the multimedia player can resume play of the second program from the second TVRP that was set when the second program was paused on the multimedia player.

Figure 7:
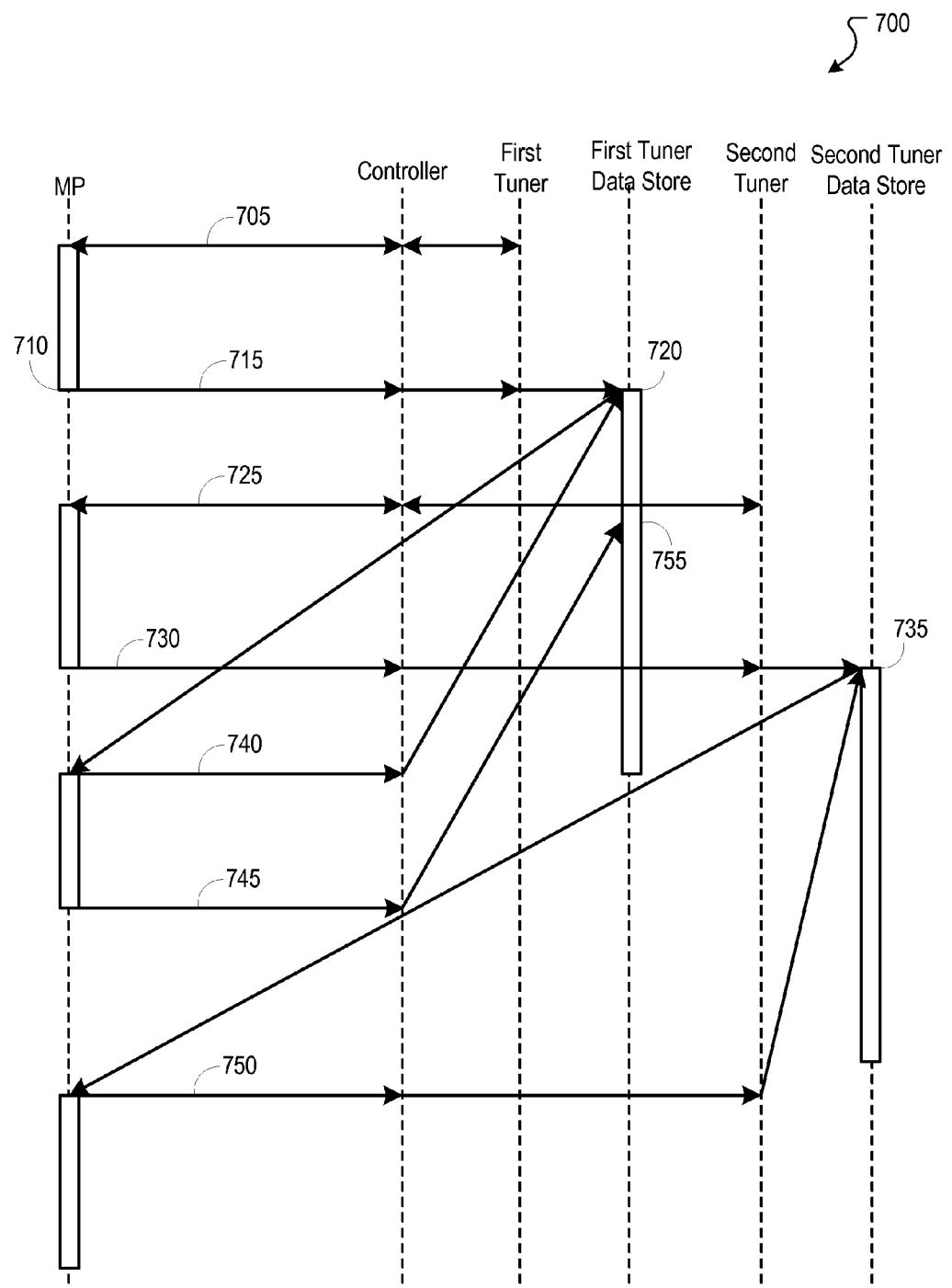
FIG. 7 is a diagram illustrating interactions between a multimedia player and a controller operable to facilitate pausing a first recorded or live television multimedia content on a multimedia player, viewing a second recorded or live television multimedia content on the same multimedia player and resuming play of the first recorded or live television multimedia content from the pause point on the same multimedia player.

FIG. 7 is a diagram 700 illustrating interactions between a multimedia player and a controller operable to facilitate pausing a first recorded or live television multimedia content on a multimedia player, viewing a second recorded or live television multimedia content on the same multimedia player and resuming play of the first recorded or live television multimedia content from the pause point on the same multimedia player. In embodiments, a multimedia player can tune to a first program and the program can be streamed from a first tuner to the multimedia player through interaction 705.

In embodiments, a user can pause a first program streaming to the multimedia player from the first tuner at point 710. In embodiments, when the user pauses the first program, the multimedia player can instruct the controller (e.g., through interaction 715) to record the paused first program on a data store associated with the first tuner. For example, when the user pauses a first program, a TVRP, the point 720 at which the data store begins recording the paused first program, can be set by the controller and can be stored on a data store associated with the first tuner.

In embodiments, the user can tune the multimedia player to a second program, and the program can be streamed from a second tuner to the multimedia player through interaction 725. In embodiments, the user can pause the second program (e.g., through interaction 730) and a second TVRP can be set by the controller and can be stored on a data store associated with the second tuner at point 735. It should be understood that the interactions illustrated in FIG. 7 can take place in a single DVR or in multiple DVRs.

In embodiments, after the user pauses the second program, the user can resume the paused first program through interaction 740. For example, when the user resumes the paused first program, the data store associated with the first tuner can stream a recording of the paused first program to the multimedia player beginning at the TVRP associated with the first program (e.g., beginning at point 720). In embodiments, the user can pause the resumed play of the first program (e.g., through interaction 745) and resume the paused second program through interaction 750. In embodiments, when the user pauses the first channel, a TVRP can be set on the data store associated with the first tuner at point 755 and can replace the first TVRP at point 720. In embodiments, when the user tunes to the paused second program, the data store associated with the second tuner can stream a recording of the paused second program to the multimedia player, beginning at the second TVRP associated with the second program (e.g., beginning at point 735).

In embodiments, if more than one device is accessing a stored paused program, there can be more than one TVRP within a single stored program. It should be understood that individual TVRP points can be marked to distinguish them from one another in the user interface.

Figure 8:
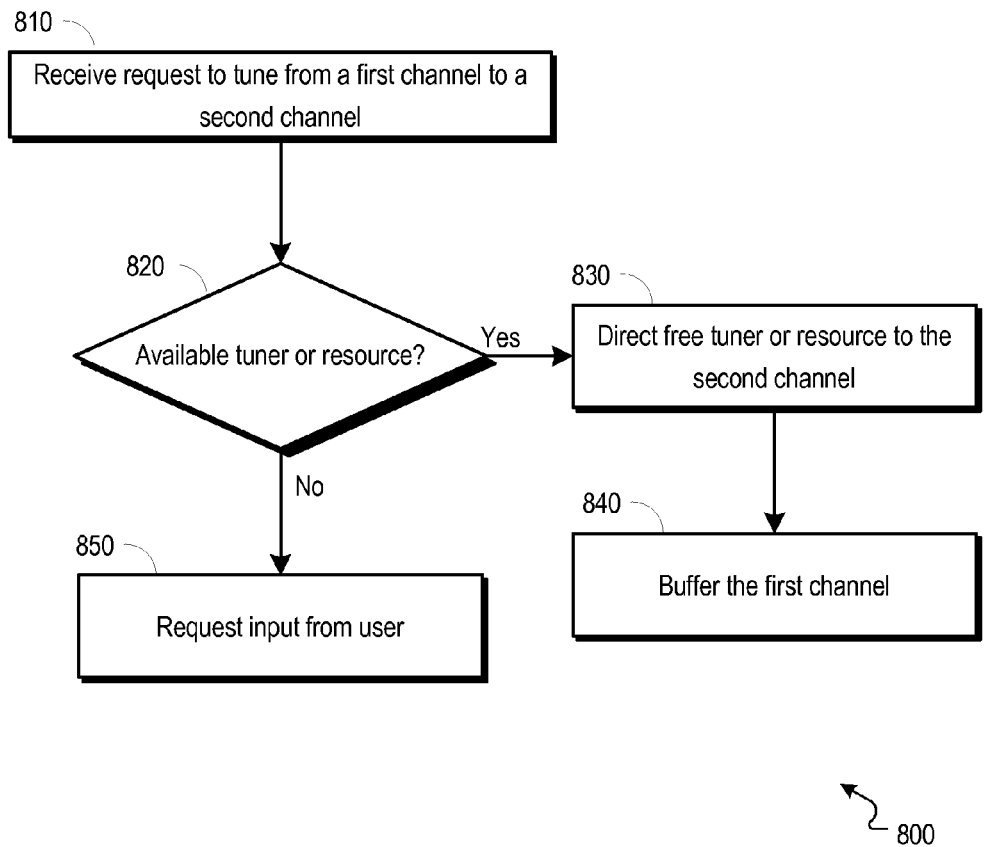
FIG. 8 is a flowchart illustrating an example process operable to facilitate pausing and buffering a first multimedia stream when a multimedia player is directed to a second multimedia stream.

FIG. 8 is a flowchart illustrating an example process 800 operable to facilitate pausing and buffering a first multimedia stream when a multimedia player is directed to a second multimedia stream. The process 800 can start at 810 when a multimedia player (e.g., master STB 110 or dependent STB 115 of FIG. 1) receives a request from a user to tune from a first channel to a second channel. In embodiments, the user can select a live television program or recorded multimedia to view on a multimedia player.

At 820, a determination can be made whether a free tuner or resource with which to receive the requested multimedia content is available. As an example, in embodiments, a master STB (e.g., master STB 110 of FIG. 1) can have a plurality of tuners, and each tuner can receive multimedia content from a downstream channel. In embodiments, a dependent STB (e.g., dependent STB 115 of FIG. 1) may or may not have a tuner(s) that is independent from an associated master STB. When a multimedia player (e.g., master STB 110 or dependent STB 115 of FIG. 1) receives a command to tune to a new channel, the multimedia player can determine whether there are any tuners associated with the multimedia player that are not being used. For example, a tuner available for use can be one that is neither being used to receive live or streaming multimedia content nor to buffer live or streaming multimedia content. Where the determination is made that a tuner or resource is available to the multimedia player, the process 800 can proceed to 830.

At 830, an available tuner can be directed to the second channel. The tuner can be directed to the second channel, for example, by the multimedia player that received the request to tune from the first channel to the second channel. It should be understood that the available tuner can be embedded within or separate from the multimedia player that received the request to tune from the first channel to the second channel.

At 840, the multimedia content being received from the first channel can be buffered. When, at 830, the available tuner is tuned to the next channel, the tuner that is receiving content from the first channel can remain on the first channel. While the multimedia player is outputting multimedia content from the next channel, the multimedia content from the first channel can be buffered. As an example, multimedia content received by a first tuner (e.g., one of the tuner(s) 200 of FIG. 2) can be stored in a content data store 210, while multimedia content received by a second tuner (e.g., a different one of the tuner(s) 200) can be output to display device (e.g., display device 340 of FIG. 3). As the first channel is buffered, the first channel can become a buffered channel.

Returning to 820, where the determination is made that there are no available tuners or resources, the process can proceed to 850. At 850, an input request can be generated and presented to the user. For example, the multimedia player that received the request to tune from the first channel to the second channel can inform the user that there are no available tuners or resources with which to receive multimedia content from the second channel. In embodiments, the multimedia player can present the user with the option to direct the tuner that is receiving content from the first channel to tune away from the first channel to the second channel, or to direct the tuner to continue receiving content from the first channel.

Figure 9:
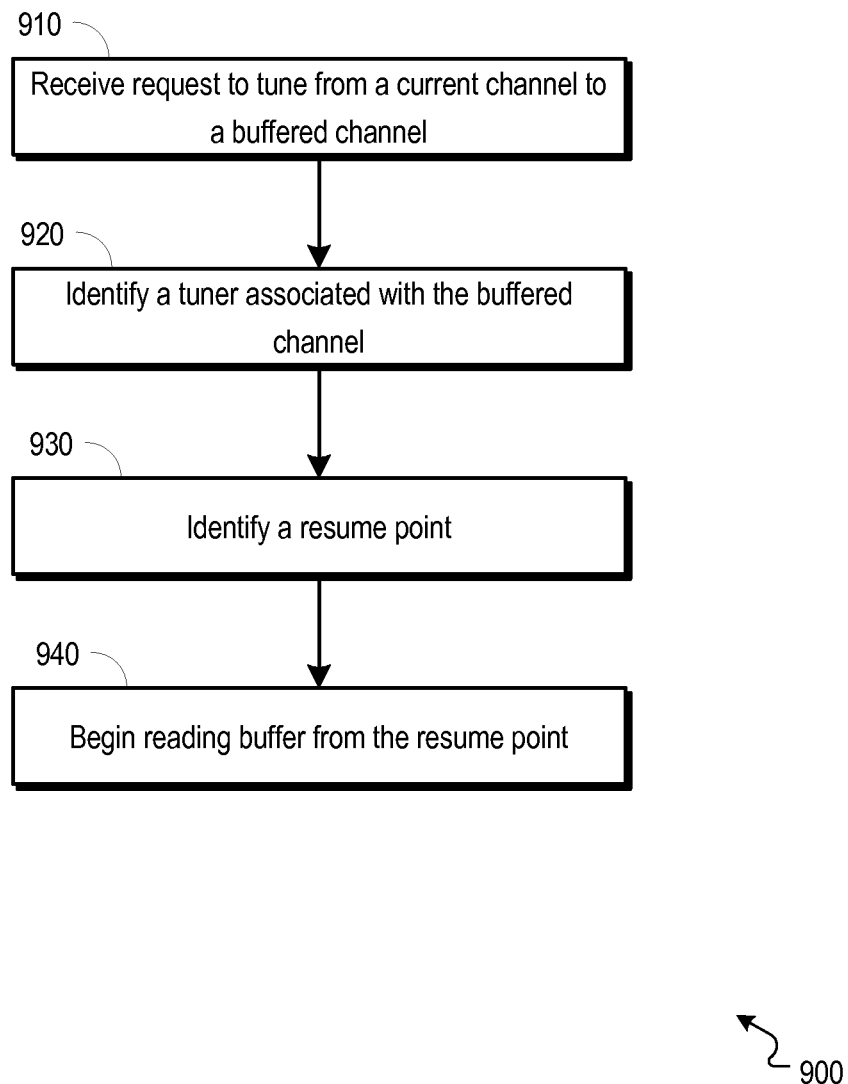
FIG. 9 is a flowchart illustrating an example process operable to facilitate resuming play of a paused channel from a point in the multimedia content at which it was paused.

FIG. 9 is a flowchart illustrating an example process 900 operable to facilitate resuming play of a paused channel from a point in the multimedia content at which it was paused. The process 900 can start at 910 when a multimedia player (e.g., master STB 110 or dependent STB 115 of FIG. 1) receives a request from a user to tune from a current channel to a buffered channel. In embodiments, the user can select a live television program or recorded multimedia to view on a multimedia player.

At 920, a tuner associated with the buffered channel can be identified. In embodiments, a multimedia player can be associated with a plurality of tuners. For example, a multimedia player (e.g., master STB 110 or dependent STB 115 of FIG. 1) can have a plurality of tuners, and the tuners can be tuned to and can receive multimedia content from different upstream channels. It should be understood that the tuners can be embedded within or can be separate from the multimedia player At 930, a resume point associated with the buffered channel can be identified. In embodiments, when a multimedia player receives a request to output multimedia content from a different channel, and a different tuner is used to receive multimedia content from the different channel, multimedia content from the first channel that is received by the first tuner can be buffered or stored for as long as the first tuner is tuned to the first channel. When multimedia content received by the first tuner is stored, a resume point (e.g., TVRP) can be established at the point in the stored multimedia content received by the first tuner where the multimedia player stopped outputting the multimedia content. For example, multimedia content received by a tuner can be stored in a content data store 210 of FIG. 2, and the resume point (e.g., TVRP) of the multimedia content can be flagged within the content data store 210.

At 940, the multimedia player can begin outputting the stored multimedia content associated with the buffered channel from the resume point. For example, the multimedia player can request the multimedia content from a data store (e.g., content data store 210 of FIG. 2) and can output the multimedia content to a display device (e.g., display device 340 of FIG. 3).

Figure 10:
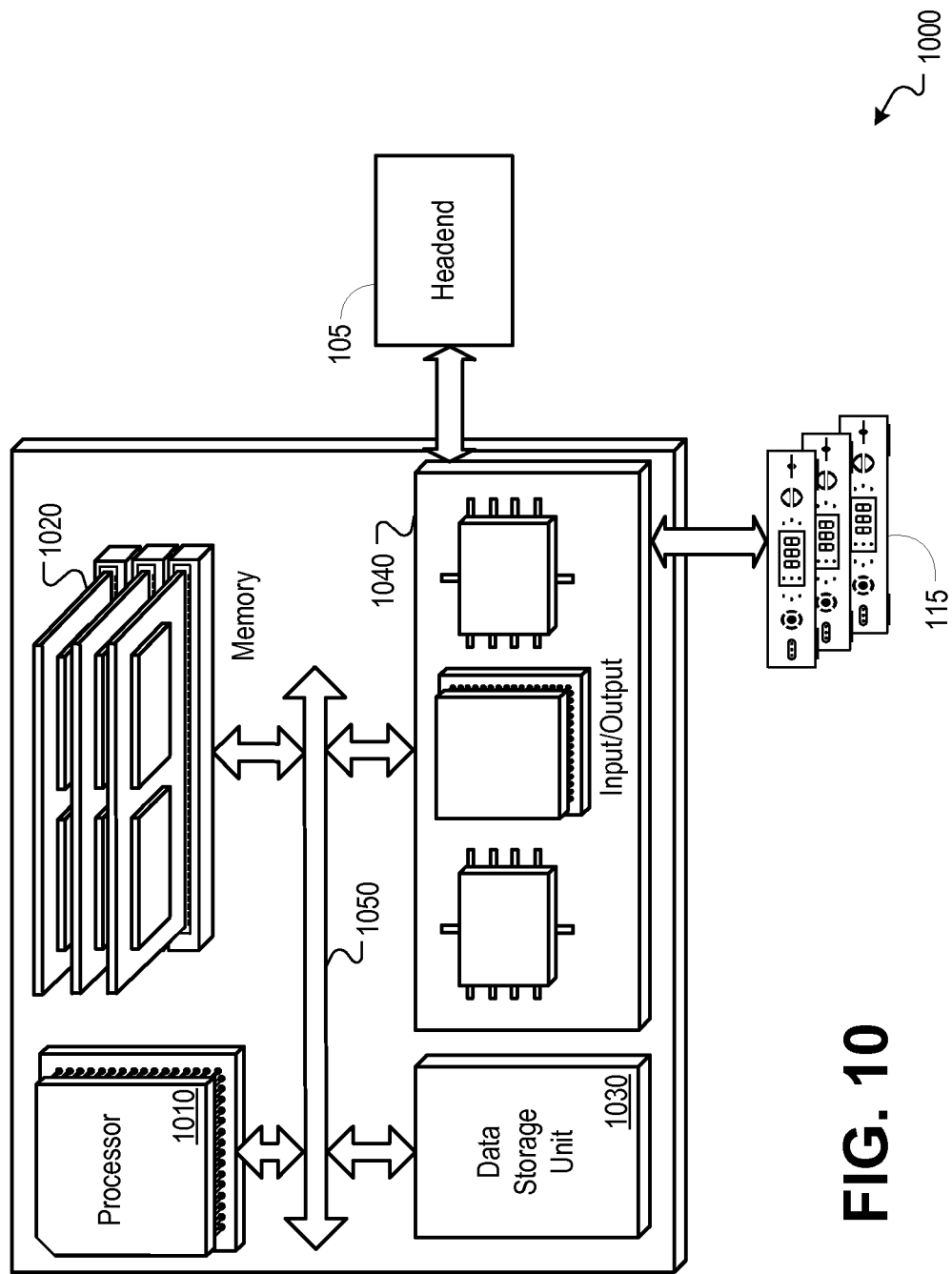
FIG. 10 is a component diagram of an example device operable to facilitate pausing playback of recorded or live television on a multimedia player and resuming playback from the pause point on the same or a different multimedia player.

FIG. 10 is a component diagram of an example device 1000 operable to facilitate pausing playback of recorded or live television on a multimedia player and resuming playback from the pause point on the same or a different multimedia player. The device 1000 can include a processor 1010, a memory 1020, a storage device 1030, and an input/output device 1040. Each of the components 1010, 1020, 1030, and 1040 can, for example, be interconnected using a system bus 1050. The processor 1010 can be capable of processing instructions for execution within the device 1000. In one implementation, the processor 1010 can be a single-threaded processor. In another implementation, the processor 1010 can be a multi-threaded processor. The processor 1010 can be capable of processing instructions stored in the memory 1020 or on the storage device 1030.

The memory 1020 can store information within the hardware configuration of the device 1000. In one implementation, the memory 1020 can be a computer-readable medium. In one implementation, the memory 1020 can be a volatile memory unit. In another implementation, the memory 1020 can be a non-volatile memory unit.

In embodiments, the storage device 1030 can be capable of providing mass storage for the device 1000. In one implementation, the storage device 1030 can be a computer-readable medium. In various different implementations, the storage device 1030 can, for example, include a hard disk device, an optical disk device, flash memory or some other large capacity storage device. In embodiments, the storage device 1030 can be a DVR or PVR.

The input/output device 1040 can provide input/output operations for the device 1000. In embodiments, the input/output device can include driver devices configured to receive input data from and send output data to a display device 340 of FIG. 3. In embodiments, the input/output device can include driver devices configured to receive input data from and send output data to a headend 105. In another implementation, the input/output device can include driver devices configured to receive input data from and send output data to a plurality of dependent set-top boxes or multimedia players 115. In still other implementations, the input/output device can include driver devices configured to receive input data from a user input device 330 of FIG. 3.

Those skilled in the art will appreciate that the invention improves user experience when pausing and recording live television. Moreover, the invention improves user ability to pause live television on a multimedia player and continue watching the paused, live television on another multimedia player.

The methods, systems, and apparatuses described in this disclosure enable communications between a gateway and one or more associated multimedia players. Moreover, the subject matter of this disclosure enables pausing and recording of a first multimedia stream where a multimedia player outputs a second multimedia stream. In embodiments, a multimedia player can begin recording a first channel received on a first tuner when the multimedia player outputs a second channel that is received on a second tuner. Further, in embodiments, a multimedia player can output paused multimedia content from the point at which the content was paused when the multimedia player is tuned to a channel associated with the multimedia content.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine readable storage device, a machine readable storage substrate, a memory device, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. In embodiments, a remote control (e.g., a device using infrared or radio frequency signals) can be used to provide for interaction with a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In embodiments, multitasking and parallel processing may be advantageous.

What is claimed is:
1. A method comprising:
  receiving content from a first channel through a first tuner;
  receiving, at a first multimedia device, a record trigger, wherein the record trigger is a request to output content from a second channel, and in response to the record trigger:

receiving content from the second channel through a second tuner;

outputting content from the second channel;

without receiving a request to pause playback of the content from the first channel, establishing a television roaming pause location in a buffer when the request to output content from the second channel is received, wherein the television roaming pause location identifies a location within the content from the first channel from which the content from the first channel was output to the first multimedia device prior to outputting content from the second channel;

buffering, from the television roaming pause location, content from the first channel while outputting content from the second channel; and creating an association between the first channel and the buffered content stream;

receiving, at a second multimedia device, a resume trigger, wherein the resume trigger comprises a tuning of the second multimedia device to the first channel, and in response to the resume trigger:

determining that content from the first channel has been buffered by identifying the association between the first channel and the buffered content stream and the television roaming pause location; and based upon the determination that content from the first channel has been buffered, outputting buffered content from the first channel beginning at the television roaming pause location when the request to output content from the first channel is received, wherein output of the buffered content is initiated without receiving a user instruction to resume playback of content associated with the first channel from the television roaming pause location, and wherein the buffered content is output to a display associated with the second multimedia device.

2. The method of claim 1, wherein the request to output content from the first channel is initiated upon tuning the first multimedia player to the first channel, wherein tuning comprises directly tuning to the first channel, automatically tuning to the first channel, returning to the first channel as a previously-viewed channel, or tuning to the first channel by selecting the first channel from an interactive channel guide.

3. The method of claim 1, wherein the television roaming pause location is automatically created when the request to output content from the second channel is received.

4. The method of claim 1, wherein the content from the first channel comprises multimedia streaming in real-time, a record buffer associated with the first channel, multimedia streaming from a pay-per-view channel, or a recording stored on a digital video recorder.

5. The method of claim 1, further comprising:

if a second tuner is not available for receiving content from the second channel, continuing to receive content from the first channel through the first tuner.

6. The method of claim 1, further comprising:

if a second tuner is not available for receiving content from the second channel, tuning the first tuner to the second channel, and receiving content from the second channel through the first tuner.

7. An apparatus, comprising:

a plurality of tuners configured to receive content from one or more channels;

a processor configured to determine that a second tuner is available to receive content from a second channel when a first tuner is receiving content from a first channel;

one or more interfaces configured to be used to:

receive a record trigger, wherein the record trigger is a user request to receive content from the second channel;

receive the content from the second channel through the second tuner; and output the content from the second channel to the user;

storage configured to buffer content from the first channel while content from the second channel is being output;

in response to the record trigger and without receiving a request to pause playback of the content from the first channel, a module configured to establish a television roaming pause location within the buffered content from the first channel when the user request to receive content from the second channel is received, wherein the television roaming pause location identifies a location within the buffered content from the first channel from which the content from the first channel was output to a first multimedia device prior to content from the second channel being output;

wherein the one or more interfaces are further configured to be used to receive a resume trigger, wherein the resume trigger comprises a tuning of the second multimedia device to the first channel;

wherein the module is further configured to determine that content from the first channel has been buffered by identifying the television roaming pause location; and wherein, in response to the resume trigger and based upon the determination that content from the first channel has been buffered, the one or more interfaces are further configured to be used to output buffered content from the first channel beginning at the television roaming pause location when the request to output content from the first channel is received, wherein output of the buffered content is initiated without receiving a user instruction to resume playback of content associated with the first channel from the television roaming pause location, and wherein the buffered content is output to a display associated with the second multimedia device.

8. The apparatus of claim 7, wherein the request to output content from the first channel comprises tuning a multimedia player to the first channel.

9. The apparatus of claim 7, wherein the storage is further configured to:

clear the television roaming pause location after outputting of buffered content associated with the first channel begins.

10. One or more non-transitory computer readable media having instructions operable to cause one or more processors to perform the operations comprising:

receiving content from a first channel through a first tuner;

receiving a request to output content from a second channel, wherein the request comprises a channel tuning instruction;

identifying an association between the second channel and a second tuner that is tuned to the second channel;

identifying a buffered content stream of the content received over the second channel based on the association between the second channel and the second tuner;

identifying a resume point within the buffered content stream from which to begin outputting the content from the second channel, the resume point being associated with the second tuner, wherein the resume point within the buffered content stream is established by a first multimedia player and the request to output content from the second channel comprises a tuning of the second multimedia player to the second channel, and wherein the resume point within the buffered content stream is established by the first multimedia player in response to a record trigger being received at the first multimedia player while the content of the second channel is being output to the first multimedia player; and outputting the content from the second channel beginning at the identified resume point of the buffered content stream, wherein the content is output to a display associated with the second multimedia player.

11. The one or more non-transitory computer-readable media of claim 10, having instructions further operable to cause the one or more processors to perform the operations comprising:

sending a message to a display device associated with the second multimedia player, wherein the message acknowledges that the content from the second channel is resuming from a resume point.

12. The one or more non-transitory computer-readable media of claim 10, wherein the resume point is the location in the content from the second channel at which buffering of the content from the second channel started.

13. The one or more non-transitory computer-readable media of claim 10, having instructions further operable to cause the one or more processors to perform the operations comprising:

clearing the resume point after starting to output the content from the second channel.

14. A method comprising:

receiving content from a first channel through a first tuner;

receiving a request to output content from a second channel, wherein the request comprises a tuning of a second multimedia player to the second channel;

identifying an association between the second channel and a second tuner that is tuned to the second channel;

identifying a buffered content stream of the content received over the second channel based on the association between the second channel and the second tuner;

identifying a resume point within the buffered content stream from which to begin outputting the content from the second channel, the resume point being associated with the second tuner, wherein the resume point within the buffered content stream is established by a first multimedia player and the request to output content from the second channel is received as a tuning instruction from the second multimedia player, wherein the tuning instruction causes the second multimedia player to tune to the second channel, and wherein the resume point within the buffered content stream is established by the first multimedia player in response to a record trigger being received at the first multimedia player while the content of the second channel is being output to the first multimedia player; and outputting the content from the second channel beginning at the identified resume point of the buffered content stream, wherein the content is output to a display associated with the second multimedia player.

15. The method of claim 14, wherein the resume point is the location in the content from the second channel at which buffering of the content from the second channel started.

16. The method of claim 14, further comprising:

clearing the resume point after starting to output the content from the second channel.

17. One or more non-transitory computer readable media having instructions operable to cause one or more processors to perform the operations comprising:

receiving content from a first channel through a first tuner;

receiving a record trigger, wherein the record trigger is a request to output content from a second channel;

determining that a second tuner is available for receiving content from the second channel;

receiving content from the second channel through the second tuner;

outputting content from the second channel;

in response to the record trigger and without receiving a request to pause playback of the content from the first channel, establishing a television roaming pause location in a buffer when the request to output content from the second channel is received, wherein the television roaming pause location identifies a location within the content from the first channel from which the content from the first channel was output to a first multimedia device prior to outputting content from the second channel; and buffering, from the television roaming pause location, content from the first channel while outputting content from the second channel;

creating an association between the first channel and the buffered content stream;

receiving a resume trigger, wherein the resume trigger comprises a tuning of a second multimedia device to the first channel;

determining that content from the first channel has been buffered by identifying the association between the first channel and the buffered content stream and the television roaming pause location; and in response to the resume trigger and based upon the determination that content from the first channel has been buffered, outputting buffered content from the first channel beginning at the television roaming pause location when the request to output content from the first channel is received, wherein output of the buffered content is initiated without receiving a user instruction to resume playback of content associated with the first channel from the television roaming pause location, and wherein the buffered content is output to a display associated with the second multimedia device.

18. The one or more non-transitory computer-readable media of claim 17, wherein the television roaming pause location is automatically created when the request to output content from the second channel is received.

19. The one or more non-transitory computer-readable media of claim 17, wherein the content from the first channel comprises multimedia streaming in real-time, a record buffer associated with the first channel, multimedia streaming from a pay-per-view channel, or a recording stored on a digital video recorder.

20. The one or more non-transitory computer-readable media of claim 17, having instructions further operable to cause the one or more processors to perform the operations comprising:

if a second tuner is not available for receiving content from the second channel, continuing to receive content from the first channel through the first tuner.

21. The one or more non-transitory computer-readable media of claim 17, having instructions further operable to cause the one or more processors to perform the operations comprising:

if a second tuner is not available for receiving content from the second channel, tuning the first tuner to the second channel, and receiving content from the second channel through the first tuner.

22. The one or more non-transitory computer-readable media of claim 10, wherein the content from the second channel is output beginning at the identified resume point without a request to resume playback of the content from the identified resume point being received.

23. The method of claim 14, wherein the content from the second channel is output beginning at the identified resume point without a request to resume playback of the content from the identified resume point being received.

* * * * *